United States Patent [19]

Robinson et al.

[11] Patent Number: 5,409,985
[45] Date of Patent: Apr. 25, 1995

[54] SINGLE-COMPONENT POLYSULPHIDE BASED SEALANT COMPOSITIONS

[75] Inventors: Raymond Robinson, Wyken; George B. Lowe, Anstey, both of England

[73] Assignee: Morton International Limited, Hounslow, England

[21] Appl. No.: 200,873

[22] Filed: Feb. 22, 1994

Related U.S. Application Data

[63] Continuation of Ser. No. 984,603, Dec. 2, 1992, abandoned.

[30] Foreign Application Priority Data

Jan. 23, 1992 [GB] United Kingdom ................. 9201482

[51] Int. Cl.⁶ .............................................. C08K 3/34
[52] U.S. Cl. .................................. 524/450; 524/881; 528/374
[58] Field of Search ................... 524/450, 881; 528/374

[56] References Cited

U.S. PATENT DOCUMENTS

| | | | |
|---|---|---|---|
| 3,659,896 | 5/1972 | Smith et al. | 524/881 |
| 3,856,740 | 12/1974 | Takahashi et al. | 524/881 |
| 4,110,295 | 8/1978 | Wilhelm et al. | 524/881 |
| 4,689,395 | 8/1987 | Bergmann et al. | 528/374 |
| 5,177,182 | 1/1993 | Lee et al. | 528/374 |

FOREIGN PATENT DOCUMENTS

| | | | |
|---|---|---|---|
| 2228388 | 11/1990 | Japan | C09K 3/10 |
| 1223655 | 3/1971 | United Kingdom | C08F 27/00 |

*Primary Examiner*—John C. Bleutge
*Assistant Examiner*—Mark D. Sweet
*Attorney, Agent, or Firm*—Mark F. LaMarre; Nick C. Kottis; Gerald K. White

[57] ABSTRACT

A one-part polysulfide sealant composition comprises a mercaptan-terminated liquid polysulfide, an oxidising agent to cure the catalyst a desiccant such as a molecular sieve, to keep the composition dry and thus prevent premature activation of the catalyst, and a cure accelerator having an acrylate or methacrylate functionality of 2 or more, preferably an acrylated liquid polysulfide or a polyfunctional methacrylate monomer. The use of this accelerator avoids the need for toxic amounts of barium oxide desiccant and substantially shortens the tack-free time on curing.

16 Claims, 2 Drawing Sheets

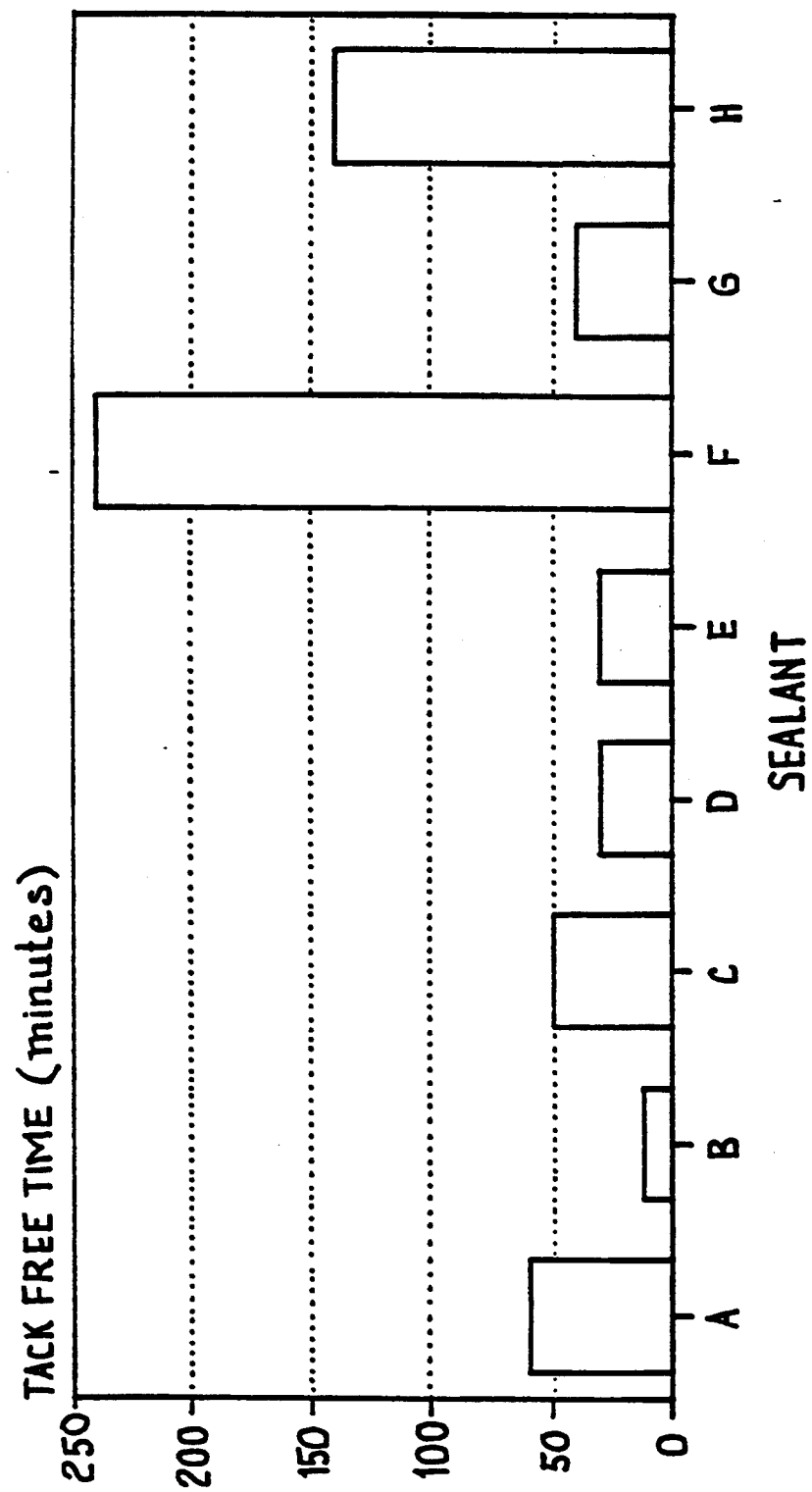

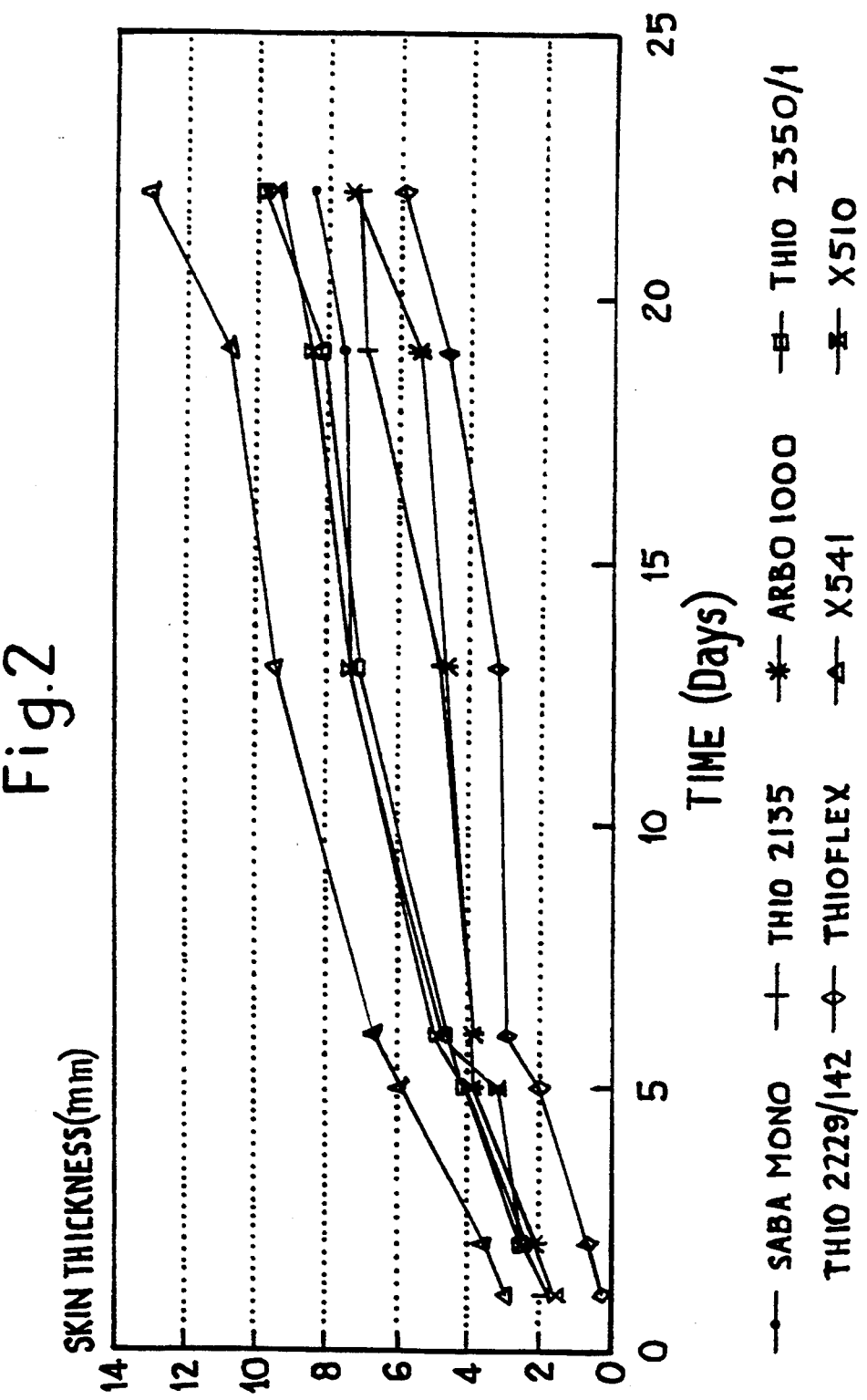

SINGLE-COMPONENT POLYSULPHIDE BASED SEALANT COMPOSITIONS

This is a continuation of application Ser. No. 07/984,603 filed on Dec. 2, 1992, now abandoned.

BACKGROUND OF THE INVENTION

1. Field of the Invention

This invention relates to the manufacture of polysulfide compositions of the type used, for example, as sealants in glazing and in other applications in the construction industry.

2. Description of the Prior Art

In preparing polysulfide sealants, a mercaptan-terminated polymer, generally a liquid polysulfide of relatively low molecular weight, is reacted with a curing agent, preferably an oxidising agent such as a metal peroxide or sodium perborate, to cure it to a solid state. The preferred liquid polysulfide polymers are those having a molecular weight of 1000–8000, a viscosity of 1 to 200 Pas and a degree of crosslinking of 2.0 or less. The preferred polymers are those prepared by Morton International Inc. and known as LP-2, LP-32 etc. The chemistry embodied in this reaction applies to all mercaptan terminated liquid polymers.

$$2\text{RSH} \xrightarrow{[O]} \text{RSSR} + \text{H}_2\text{O}$$

Curing agents such as calcium peroxide require the presence of water to activate them. It is therefore possible, instead of using a cumbersome two-part sealant composition, to use a one-part composition of liquid polysulfide and curing agent which is kept free of water until used. Once the sealant is in place it forms a skin and slowly cures to a rubber state through the presence of atmospheric moisture.

EP-A-0 377 485 discloses a one-part polysulfide sealant composition which is partially cured and in which curing is stopped by the addition of a desiccant to give a stable prepolymer which can be stored and subsequently cured, without an induction period, by exposure to moisture and optionally a further curative.

The cure rate of a one-part sealant composition, which is generally measured in terms of tack-free time and speed of through-cure, is controlled to a large extent by the overall alkalinity of the formulation. High alkalinity enhances the cure rate, and it is common practice to increase the alkalinity by adding oxides of heavy metals, especially barium oxide, BaO.

Barium oxide has a dual role in one-part polysulfide compositions, and is primarily added as a desiccant, to absorb all the water from the composition and thus inhibit chemical curing to enable the composition to be stored. This can be done after an initial curing period, as in EP-A-0 377 485, since the initial cure does not significantly increase viscosity but enables the subsequent full cure to be effected without an induction period. The composition, which may contain a cure catalyst such as calcium peroxide, can be stored in suitable watertight containers such as drums, tins or plastic cartridges, for a year or more before use.

Upon exposure of the sealant composition the barium oxide absorbs atmospheric moisture and becomes saturated, after which water is available to activate the catalyst and initiate the final cure. The hydrated oxide is highly alkaline, especially in the case of barium oxide, and the cure proceeds rapidly on the surface, giving rise to a rapid loss of tackiness.

The use of barium oxide has two disadvantages. First, BaO is toxic with the result that the composition has to be labelled as toxic. Secondly, its overall effect on the cure rate is a negative one because of its efficacy as a desiccant. If the BaO content is reduced below the level at which the composition has to be labelled as toxic, the tack-free time becomes unacceptably long, even though the through-cure may proceed more rapidly.

SUMMARY OF THE INVENTION

It is accordingly an object of the invention to develop one-part polysulfide sealant compositions which do not contain toxic levels of heavy metal oxides but which nonetheless exhibit reduced tack-free times and an accelerated through-cure rate.

According to the present invention this object is attained by providing a one-part polysulfide sealant composition comprising:

(a) a mercaptan-terminated liquid polysulfide;
(b) a cure catalyst for the mercaptan-terminated polysulfide;
(c) a desiccant; and
(d) a cure accelerator selected from monomeric and polymeric acrylate and methacrylate-functional compounds having an acrylate or methacrylate functionality of at least 2.

It has been found that the addition of an acrylate or methacrylate functional cure accelerator such as an acrylated liquid polysulfide or a polyfunctional methacrylate monomer to a one part polysulfide sealant system not only reduces the tack-free time dramatically but also accelerates even further the rate of through-cure. The acrylate or methacrylate groups are believed to initiate chain extension and cross-linking reactions, which are not inhibited by the presence of residual desiccant.

An important advantage of the present invention is that reduced tack-free time and accelerated through-cure can be obtained without the need to use toxic materials such as barium peroxide.

BRIEF DESCRIPTION OF THE DRAWINGS

FIG. 1 is a bar chart showing the tack free time of a composition in accordance with the invention and comparative compositions; and FIG. 2 is a graphical depiction of skin thickness as a function of time for a composition in accordance with the invention and comparative composition.

DETAILED DESCRIPTION OF THE PREFERRED EMBODIMENTS

The preferred liquid polysulfide (LP) polymers for use in the compositions of the present invention are those of relatively high number average molecular weight such as 2500 to 8000 and low degree of branching. A wide range of liquid polysulfide polymers is produced by Morton International Inc., these being formed by the condensation in aqueous suspension of sodium polysulfide with bis-(2-chloroethyl) formal. The average structure of the liquid polymer is:

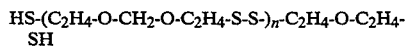

HS-(C$_2$H$_4$-O-CH$_2$-O-C$_2$H$_4$-S-S-)$_n$-C$_2$H$_4$-O-C$_2$H$_4$-SH

The value of the repeat unit n, which is generally in a range of 5 to 50, governs the viscosity of the LP polymer. The degree of branching of the liquid polysulfide, expressed as a percentage of trifunctional monomer, is preferably not more than 2 mole %, more preferably 0.5 mole %. A summary of the properties of the Morton International Inc. range of LP polymers is given in the following table:

TABLE 1

| Polymer | Average Molecular Mass | Repeat Unit 'n' Value | % Tri-functional Monomer (mole %) | Average Mercaptan Content (moles/Kg) | Average Viscosity at 25° C. (Pa.s) |
| --- | --- | --- | --- | --- | --- |
| LP-1400C | 1000 | 6 | 0 | 2.06 | 1.15 |
| LP-33 | 1000 | 6 | 0.5 | 1.75 | 1.75 |
| LP-3 | 1000 | 6 | 2 | 2.06 | 1.15 |
| LP-980C | 2600 | 15 | 0.5 | 0.91 | 12.5 |
| LP-977C | 2600 | 15 | 2 | 0.91 | 12.5 |
| LP-541C | 4000 | 23 | 0 | 0.53 | 46.5 |
| LP-12C | 4000 | 23 | 0.2 | 0.53 | 46.5 |
| LP-32C | 4000 | 23 | 0.5 | 0.53 | 46.5 |
| LP-2C | 4000 | 23 | 2 | 0.60 | 46.5 |
| LP-31 | 8000 | 42 | 0.5 | 0.38 | 110 |

Of these, the preferred polymer is LP-32C.

One preferred cure accelerator is an acrylated liquid polysulfide having an acrylate functionality of more than two, preferably three or more. The mercaptan-terminated liquid polysulfide should preferably have a mercaptan functionality of at least 2 and the sum of the acrylate or methacrylate functionality of the cure accelerator and the mercaptan functionality of the mercaptan-terminated LP is preferably at least 4.5.

One type of acrylated liquid polysulfide which has proved particularly suitable for use in the compositions of the invention is the reaction product of a mercaptan-terminated polysulfide having a low molecular weight such as 500-2000 with an acrylated monomer having three or more acrylate groups. One such acrylated LP is the reaction product of LP-3 (see Table 1 above) with trimethylolpropanetriacrylate (TMPTA). The reaction product has an acrylate functionality of 4 and has the general formula:

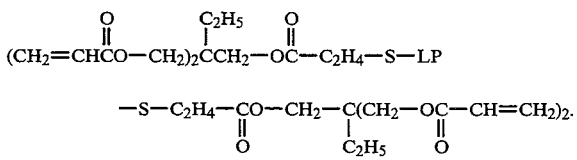

This acrylated LP is sold by Morton International Inc under the trade mark ZL-1866.

The curing agent may be any of those commonly used for curing liquid polysulfides, for example calcium peroxide, urea hydrogen peroxide, sodium perborate, sodium peroxide or manganese dioxide.

The desiccant may for example be a molecular sieve desiccant.

According to one embodiment of the invention the sealant composition comprises, as a cure accelerator a multifunctional methacrylate monomer, preferably a dimethacrylate. The use of a methacrylate monomer as a cure accelerator also obviates the need to use BaO at levels requiring toxicity labelling.

Suitable methacrylate monomers include diethylene glycol dimethacrylate (DEGDMA), tetraethylene glycol dimethacrylate (TEGDMA) and 2-ethyl-2 (hydroxymethyl) 1,3-propanediol trimethacrylate (TMPTMA). The relatively low molecular weight DEGDMA has been found to give a low degree of cross-linking compared with TEGDMA and with accelerators having a higher methacrylate function, and thus has the advantage of not increasing the modulus of the cured system.

The one part sealant compositions containing the methacrylate monomers have been found to have good package stability when stored for periods in excess of three months at 25° C. and 50% relative humidity in a closed container, and to give enhanced rates of cure when used. These compositions have been found particularly useful with liquid polysulfides with a low degree of branching, such as LP12C.

The cure accelerator is preferably present in an amount of 1 to 10 weight parts, more preferably 2 to 6 weight parts, per 100 weight parts of the mercaptan-terminated polysulfide.

The invention will be further illustrated by the following specific examples, wherein all proportions are by weight unless otherwise indicated.

EXAMPLE 1

Three one-part liquid polysulfide compositions were made up as shown in Table 2, the amount of each component being indicated in parts by weight:

TABLE 2

| COMPONENT | X510 (Ref.) | X541 | X542 (Ref.) |
| --- | --- | --- | --- |
| LP32C | 71 | 71 | 74 |
| Zeolite (molecular sieve desiccant) | 3 | 3 | 3 |
| Plasticiser A (TP759 α-methyl styrene polymer) | 15.5 | 16 | 16 |
| Ground Calcium Carbonate | 60 | 62.5 | 62.5 |
| Precipitated Calcium Carbonate | 48 | 50 | 50 |
| Ceto Stearyl Mercaptan | 0.6 | 0.6 | 0.6 |
| Thixatrol ST (Rheological agent) | 5 | 3.35 | 3.35 |
| Plasticiser B (Phthalate ester) | 22 | 25 | 25 |
| Titanium Dioxide pigment | 12 | 12 | 12 |
| Silane A187 coupling agent | 0.6 | 0.6 | 0.6 |
| Cure paste - NaBO$_2$ in plasticiser | 6.5 | 6.5 | 6.5 |
| Acrylated LP (ZL1866) | — | 3 | — |
| Barium Oxide Paste | 3 | 3 | 3 |

Composition X510 was a production batch used as a reference composition containing no acrylated liquid polysulfide. Composition X541 was a laboratory batch in accordance with the present invention. Reference Composition X542 was a laboratory batch similar to X541 but with an extra 3 parts of LP32C instead of the acrylated LP. The amount of BaO in the composition is small enough to obviate the need for labelling as toxic.

The curing of the three compositions was monitored, and the mechanical properties of the cured polymers were tested. Table 3 shows the tack free times on curing at 23° C. and 65% relative humidity and the lap shear load (TB) and extension at break (EB) after 21 days of curing and after a further cure at 70° C.

TABLE 3

| COMPOSITION | X510 (Ref.) | X541 | X542 (Ref.) |
| --- | --- | --- | --- |
| Tackfree @ 23° C. 65% RH: | >6h30m | 30m | 2h40m |
| Cure 21 days | | | |
| TB | 180N | 280N | 95N |
| EB | >150% | 60% | >100% |
| Cure after 70° C. | | | |
| TB | 200N | 375N | 330N |
| EB | 100% | 80% | 100% |

It can be seen from these results that the use of an acrylated LP in accordance with the invention greatly enhances the cure rate without the need for toxic levels of BaO or the like, while still giving a cured polymer with satisfactory mechanical properties.

EXAMPLE 2

A further study of the cure rates of compositions in accordance with the invention, under various conditions was carried out by making up further samples in accordance with formulation X541 but varying the amount of ZL 1866 acrylated LP. The samples were tested for tack free time at different curing temperatures and relative humidity levels. The results are shown in Table 4.

TABLE 4

| Parts ZL 1866 per 100 Parts LP32C Polymer | Tack free Time in minutes | | |
|---|---|---|---|
| | Temperature Humidity Conditions | | |
| | 23° C. 65% RH | 23° C. 50% RH | 16.5 C. 86% RH |
| 0 | 180 | 150 | 160 |
| 2 | 170 | 70 | 155 |
| 4 | 85 | 70 | 80 |
| 6 | 40 | 70 | 80 |

Similar samples were tested for skin development or curing at 23° C. and 65% relative humidity over 26 days. The results are shown in Table 5.

TABLE 5

| | Skin Development at 23° C. 65% RH Thickness in Millimeters | | | |
|---|---|---|---|---|
| Number of Days | Parts ZL 1866 per 100 Parts Polymer (LP32C) | | | |
| | 0 | 2 | 4 | 6 |
| 0 | 0 | 0 | 0 | 0 |
| 1 | 2.5 | 2.5 | 2.7 | 2.9 |
| 5 | 4.1 | 4.8 | 5.4 | 6.2 |
| 7 | 6 | 6.2 | 6.6 | 7.1 |
| 12 | 7.1 | 7.5 | 8.4 | 9.4 |
| 15 | 8.4 | 9 | 9.4 | 10.4 |
| 20 | 8.7 | 11.2 | 11.9 | 12.5 |
| 26 | 10.7 | 12.1 | 12.7 | 14 |

EXAMPLE 3

A further sample of formulation X541 containing 5 parts of acrylated LP ZL 1866 per 100 parts of LP32C was made up and its cure properties at 23° C. and 65% relative humidity were compared with those of X510 and of six other commercial sealant compositions, the tested compositions being designated as follows:

A:Saba Monoseal
B:Thiokol 2135
C:Arbokol 1000
D:Thiokol 2350/1
E Thiokol 2229/142
F:Thioflex One
G:X541
H:X510

Compositions A to E contain levels of barium oxide which necessitate their being labelled as toxic. Compositions F to H do not. The results are shown in the accompanying drawings, wherein FIG. 1 is a bar chart showing the tack free time of each composition and FIG. 2 is a graph showing skin thickness plotted against time.

Referring first to FIG. 1, it can be seen that the tack free time of composition G, in accordance with the invention, compares well with those of the BaO-containing sealants, and is considerably shorter than that of either of the compositions which do not contain toxic levels of BaO.

Referring to FIG. 2, the skin development of the composition of the invention is shown to be superior to that of any of the other compositions tested.

EXAMPLE 4

To test the properties of the multifunctional acrylate and methacrylate accelerators, several samples of a sealant composition were made up comprising 100 weight parts of liquid polysulfide LP12C (see Table 1) and 3 weight parts of sodium perborate monohydrate curative. To these were added methacrylate cure accelerators in the amounts shown in Table 6. The compositions containing the accelerators were found to exhibit enhanced skin formation on curing, with shortened tack free times. The mechanical properties of the cured sealants were tested and compared with those of a reference sample containing no methacrylate cure accelerator. The results are shown in Table 6.

TABLE 6

| METHACRYLATE | Amount (P.B.W.) | Lap Shear Force(N) | Extension at break (%) |
|---|---|---|---|
| Nil | — | 90 | 62 |
| TEGDMA | 2.5 | 150 | 200 |
| TEGDMA | 5 | 52 | 791 |
| TMPTMA | 5 | 74 | 38 |

The methacrylate monomers have the added advantage that they do not present the health hazards associated with the corresponding acrylate monomers.

What is claimed is:

1. A one-part polysulfide sealant composition comprising:
   a) a mercaptan-terminated liquid polysulfide;
   b) a cure catalyst for the liquid polysulfide;
   c) a desiccant; and
   d) a cure accelerator selected from monomeric and polymeric acrylated liquid polysulfide compounds having an acrylate functionality of at least 2.

2. A sealant composition as claimed in claim 1 wherein the mercaptan-terminated liquid polysulfide (a) has an number average molecular weight of 2500 to 8000.

3. A sealant composition as claimed in claim 1 wherein the mercaptan-terminated liquid polysulfide (a) contains not more than 2 mole % of trifunctional monomer.

4. A sealant composition as claimed in claim 1 wherein the mercaptan-terminated liquid polysulfide (a) has an average structure defined by the formula:

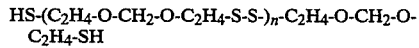

$$HS\text{-}(C_2H_4\text{-}O\text{-}CH_2\text{-}O\text{-}C_2H_4\text{-}S\text{-}S\text{-})_n\text{-}C_2H_4\text{-}O\text{-}CH_2\text{-}O\text{-}C_2H_4\text{-}SH$$

wherein n has a value from 5 to 50.

5. A sealant composition as claimed in claim 1 wherein the cure catalyst (b) is selected from calcium peroxide, urea hydrogen peroxide, sodium perborate, sodium peroxide and manganese dioxide.

6. A sealant composition as claimed in claim 1 wherein the desiccant is a molecular sieve desiccant.

7. A sealant composition as claimed in claim 1 wherein the cure accelerator (d) comprises a polysulfide having an acrylate functionality of more than 2.

8. A sealant composition as claimed in claim 7 wherein the polysulfide cure accelerator (d) has an acrylate functionality of at least 3.

9. A sealant composition as claimed in claim 8 wherein said cure accelerator (d) comprises the reaction product of a mercaptan-terminated liquid polysulfide having a molecular weight of 500 to 2000 with an acrylated monomer having three or more acrylate groups.

10. A sealant composition as claimed in claim 9 wherein said acrylated monomer is trimethylolpropane triacrylate.

11. A sealant composition as claimed in claim 1 wherein the sum of the acrylate or methacrylate functionality of said cure accelerator (d) and the mercaptan functionality of said mercaptan-terminated liquid polysulfide is at least 4.5.

12. A sealant composition as claimed in claim 1 wherein said cure accelerator (d) comprises a polyfunctional methacrylate monomer.

13. A sealant composition as claimed in claim 12 wherein said methacrylate monomer is selected from diethylene glycol dimethacrylate (DEGDMA), tetraethylene glycol dimethacrylate (TEGDMA) and 2-ethyl-2-(hydroxymethyl)-1,3-propanediol trimethacrylate.

14. A sealant composition as claimed in claim 1 which comprises 1 to 10 weight parts of said cure accelerator (d) per 100 weight parts of mercaptan-terminated polysulfide (a).

15. A sealant composition as claimed in claim 14 which comprises 2 to 6 weight parts of said cure accelerator (d) per 100 weight parts of mercaptan-terminated polysulfide (a).

16. A sealant composition as claimed in claim 1 wherein the monomeric acrylated liquid polysulfide is a polyfunctional methacrylate monomer.

* * * * *